US012715815B2

(12) United States Patent
Klischat et al.

(10) Patent No.: US 12,715,815 B2
(45) Date of Patent: Aug. 25, 2026

(54) BATCH FOR THE PRODUCTION OF A COARSE CERAMIC REFRACTORY BASIC PRODUCT, SUCH PRODUCT AND METHOD FOR ITS PRODUCTION, LINING OF AN INDUSTRIAL FURNACE AND INDUSTRIAL FURNACE

(71) Applicant: Refratechnik Holding GmbH, Munich (DE)

(72) Inventors: Hans-Jürgen Klischat, Göttingen (DE); Holger Wirsing, Göttingen (DE); Carsten Vellmer, Göttingen (DE)

(73) Assignee: Refratechnik Holding GmbH, Munich (DE)

( * ) Notice: Subject to any disclaimer, the term of this patent is extended or adjusted under 35 U.S.C. 154(b) by 1108 days.

(21) Appl. No.: 17/785,148

(22) PCT Filed: Dec. 18, 2020

(86) PCT No.: PCT/EP2020/087296

§ 371 (c)(1),
(2) Date: Jun. 14, 2022

(87) PCT Pub. No.: WO2021/123363

PCT Pub. Date: Jul. 24, 2021

(65) Prior Publication Data

US 2022/0396528 A1 Dec. 15, 2022

(30) Foreign Application Priority Data

Dec. 18, 2019 (DE) ........................ 102019220085.0

(51) Int. Cl.
*C04B 35/05* (2006.01)
*C04B 35/626* (2006.01)
(Continued)

(52) U.S. Cl.
CPC ........ *C04B 35/05* (2013.01); *C04B 35/62635* (2013.01); *C04B 35/62655* (2013.01);
(Continued)

(58) Field of Classification Search
CPC ................................................ C04B 35/04–05
See application file for complete search history.

(56) References Cited

U.S. PATENT DOCUMENTS 2,599,184 A * 6/1952 Lathe ...................... C04B 35/01 501/119
4,954,463 A * 9/1990 Knauss ................. C04B 35/043 501/109
4,971,934 A 11/1990 Schiavi et al.

FOREIGN PATENT DOCUMENTS

SU 210006 A1 12/1968
WO 2004056718 A2 7/2004
(Continued)

OTHER PUBLICATIONS

Zhu. Machine translation of CN1039792. Published on Feb. 21, 1990. Machine translated on Dec. 22, 2025 (Year: 1990).*
(Continued)

*Primary Examiner* — Matthew E. Hoban
(74) *Attorney, Agent, or Firm* — Dickinson Wright PLLC

(57) ABSTRACT

A dry backfill for producing a basic molded heavy-clay refractory product, to such a product and a method for producing the same, to a lining of an industrial furnace, and to an industrial furnace.

42 Claims, 3 Drawing Sheets

Figure 1:
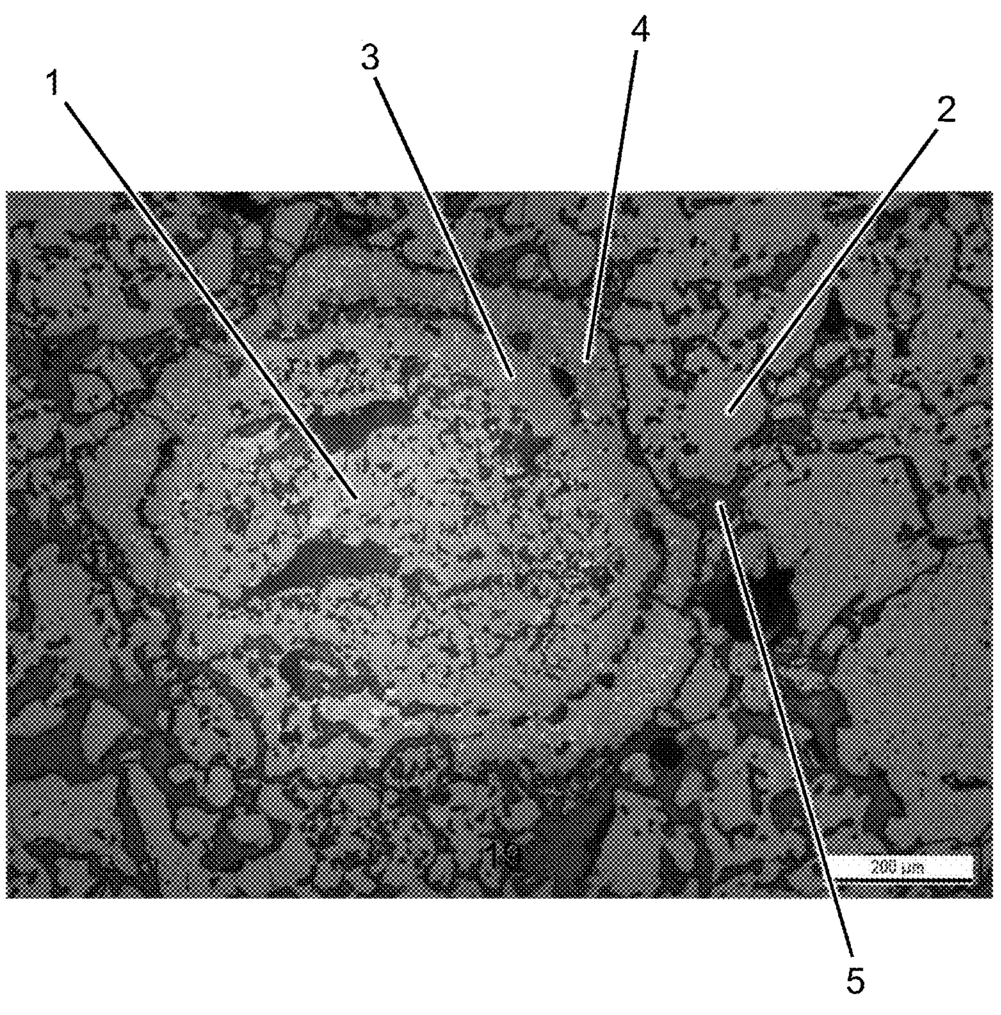

(51) Int. Cl.
*C04B 35/63* (2006.01)
*C04B 38/00* (2006.01)

(52) U.S. Cl.
CPC ...... *C04B 35/6303* (2013.01); *C04B 38/0045* (2013.01); *C04B 38/0058* (2013.01); *C04B 2235/3206* (2013.01); *C04B 2235/3217* (2013.01); *C04B 2235/606* (2013.01); *C04B 2235/725* (2013.01); *C04B 2235/94* (2013.01); *C04B 2235/96* (2013.01)

(56) References Cited

FOREIGN PATENT DOCUMENTS

| | | | |
|---|---|---|---|
| WO | 2007096246 | A2 | 8/2007 |
| WO | 2019053167 | A1 | 3/2019 |

OTHER PUBLICATIONS

PCT Application No. PCT/EP2020/087296: International Search Report—translation—Notification of Transmittal of Translation dated Jun. 23, 2022, Report dated Nov. 11, 2021 (5 pages).
Russian Patent Application No. 2022119363/03(040802): Russian Office Action with translation dated Dec. 26, 2022 (17 pages).
Horoshavin, Magnesial Refractory Products with translation, Intermet Engineering, 2021, p. 543, 4th paragraph, Moscow (3 pages).

* cited by examiner

Ca 0-10 at.%

Si 0-6 at.%

BATCH FOR THE PRODUCTION OF A COARSE CERAMIC REFRACTORY BASIC PRODUCT, SUCH PRODUCT AND METHOD FOR ITS PRODUCTION, LINING OF AN INDUSTRIAL FURNACE AND INDUSTRIAL FURNACE

This application is a U.S. National Phase under 35 U.S.C. § 371 of International Application No. PCT/EP2020/087296, filed Dec. 18, 2020, which claims priority to German Patent Application No. 10 2019 220 085.0, filed Dec. 18, 2019.

The present invention relates to a dry batch for the production of a coarse ceramic refractory basic shaped product, to such a product and to a method of its production, and to a lining of an industrial furnace and an industrial furnace.

The term "refractory" in the context of the invention is not intended to be limited to the definition according to ISO 836 or DIN 51060, which define a pyrometric cone equivalent of >1500° C. Refractory products in the sense of the invention have a refractoriness under load value $T_{0.5}$ according to DIN EN ISO 1893: 2008-09 of $T_{0.5} \geq 600°$ C., preferably $T_{0.5} \geq 800°$ C. Accordingly, refractory or fire-resistant granular materials or grainings in the sense of the invention are those materials or grainings which are suitable for a refractory product with the above-mentioned refractoriness under load value $T_{0.5}$.

The refractory products according to the invention are used for the protection of aggregate structures in aggregates where temperatures between 600 and 2000° C., in particular between 1000 and 1800° C., predominate.

Coarse ceramic products are known to be products produced from granular material with grain sizes of up to 6 mm, in special cases also up to 25 mm (see "Gerald Routschka/Hartmut Wuthnow, Praxishandbuch "Feuerfeste Werkstoffe", 5th edition, Vulkan-Verlag (hereinafter referred to simply as "Practice Manual"), chapter 2).

In this context, the term "granular material" or "graining" within the meaning of the invention encompasses a pourable solid material consisting of many small, solid grains. If the grains have a grain size≤200 μm, the granular material is a meal or powder. If the grains are produced by mechanical comminution, e.g. crushing and/or grinding, it is a crushed granular material or a broken granular material. However, a granular material may also comprise granular grains or pellet grains that are produced by granulating or pelletizing, respectively, without mechanical comminution. The grain distribution of the granular material is usually adjusted by sieving.

Furthermore, unless otherwise indicated, the grain sizes specified within the scope of the present invention are determined in accordance with DIN 66165-2:2016-08.

In the context of the invention, grain fractions or grain classes have grain sizes between the two specified test grain sizes. The designation grain fraction or grain class thus means that no grains remain on the upper sieve and none fall through the lower sieve. There is therefore no oversize and no undersize grain.

In contrast, the term "grain group" includes that some grains remain on the upper sieve (oversize grain) and some fall through the lower sieve (undersize grain).

In addition, grain fractions or grain groups used in the field have grains of different sizes. They therefore have a grain distribution or grain size distribution. They are not single grain fractions or single grain groups.

In the case of coarse ceramic products, a further distinction is made between shaped and unshaped products.

Shaped coarse ceramic products are unfired, tempered or ceramically fired products, preferably produced in a ceramic factory, in particular bricks or plates. They have a defined geometry and are ready for installation. Shaping is carried out, for example, by pressing, stamping, ramming or slip casting. The shaped products, in particular the bricks, are walled with mortar or without mortar ("crunch"), e.g. to form a lining. The production process of coarse ceramic shaped products is usually divided into the following steps (Practice Manual, page 15/item 2.1):

- Preparation
- Mixing
- Shaping
- Drying
- (if necessary) thermal treatment up to 800° C., firing or sintering
- Subsequent treatment (if necessary)

Unshaped products are products which, usually at the user's site, are formed into their final shape from an unshaped mass or from lumps, e.g. by casting, vibrating, poking, stamping or gunning. Unshaped products are usually placed behind formwork in larger fields at the place of use and, after hardening, form part of the lining. For example, unshaped products are gunning masses, stamping masses, casting masses, vibrating masses or grouting masses.

Both shaped and unshaped products are produced from a coarse ceramic batch in a manner known per se.

Furthermore, it is well known that refractory products are divided into non-basic (Practice Manual, 4.1) and basic products (Practice Manual, 4.2). According to DIN EN ISO 10081:2005-05, a distinction is made between nonbasic and basic refractory products, based in particular on the chemical reaction behavior. The product group of non-basic products comprises the materials of the $SiO_2$—$Al_2O_3$-series and other materials that cannot be further classified according to their chemical reaction behavior, such as SiC and carbon products. The essential characteristic of most basic products is that the sum of the oxides MgO and CaO predominates. In addition, chromite, picrochromite, spinel and forsterite bricks are attributed to the basic products, although they are almost neutral. Shaped basic products include, in particular, products containing magnesia, especially magnesia products, magnesia chromite products, magnesia spinel products, magnesia zirconia products, magnesia pleonaste products, magnesia galaxite products, magnesia hercynite products, magnesia doloma products (see, e.g., Practice Manual, p. 99/100, tables 4.26 and 4.27). Basic unshaped products are products whose aggregates consist essentially of magnesia, dolomite, chromium magnesia, chromium ore and spinel (see e.g. Practice Manual, p. 146).

Due to their basic character and the high melting point of MgO, magnesia bricks comprise high hot strength and good resistance to basic impurities. However, magnesia bricks are generally very brittle because they have a relatively high modulus of elasticity (E-modulus) and unfavorable shear modulus (G-modulus). They are therefore sensitive to stress changes, especially due to thermal shock, and thus comprise low thermal shock resistance (TSR).

The aim is therefore to adjust lower moduli of elasticity in order to improve the thermomechanical durability. For example, it is known to add a so-called elastifier or elastifier component to the batch. For example, the elastified products are magnesia chromite, magnesia spinel, magnesia zirconia, magnesia hercynite and magnesia galaxite products, in particular bricks (Practice Manual, page 101/No. 1). The elastifier component can also produce the elastifying products in the batch only during ceramic firing. This is called in situ elastification. In the case of unfired products, in situ elastification occurs during service.

Elastifiers are thus granular, refractory, mineral materials, usually based on compounds of the base materials, which are usually contained in the batch in quantities of 3 to 30 ma.-% (=mass %) in relation to the sum of elastifier and main component. They generally cause so-called microcracking in the matrix or microstructure of a refractory product formed from the batch at high temperatures and subsequent cooling due to different expansion coefficients. This elastification reduces the modulus of elasticity and shear modulus, and thus the brittleness of the ceramic product. This thus increases the thermal shock resistance.

Thus, raw materials whose thermal expansion coefficient is considerably higher or lower than that of magnesia are used as elastifiers. For example, chromium ores, raw materials from the spinel group (e.g. hercynite, pleonast, MA spinel), zirconium oxide, calcium hexaaluminate and smirgel are used as elastifiers.

An example of elasticized products are magnesia spinel bricks, as already explained.

Magnesia spinel bricks are fired basic products, which mineralogically essentially consist of periclase (MgO) and spinel ($MgO \cdot Al_2O_3$). According to classification, they contain at least 40 ma.-% MgO to differentiate them from spinel bricks. The MA-spinel present in magnesia spinel bricks originates either from separate pre-syntheticizing or from in-situ formation from $Al_2O_3$ additives (alumina raw materials) with the MgO of the magnesia raw material, e.g. the sintered magnesia, during the firing process of the bricks (Practice Manual, item 4.2.4.1).

Magnesia or a magnesia raw material or magnesia grade is a raw material which contains predominantly (>50 ma.-%) magnesium oxide (periclase). Magnesium carbonate and MA-spinel are therefore no magnesia raw material.

Due to their chemical/mineralogical composition, magnesia spinel products are highly resistant to thermal shock. Due to their low E-modulus and low G-modulus compared to pure magnesia products, they are more able to relieve thermal and mechanical stresses.

Magnesia spinel products are therefore used for lining the burning zones of rotary and shaft kilns for burning cement, lime, dolomite and magnesite.

In this context, U.S. Pat. No. 4,971,934 discloses a refractory batch comprising at least 70 ma.-% MgO, 4 to 30 ma.-% $Al_2O_3$ and 1.4 to 7.5 ma.-% $MnO_2$. At least a main amount of the $Al_2O_3$ is present in the form of $MgAl_2O_4$ spinel and the amount of the $Al_2O_3$, which is present in another form, is not more than 10 ma.-%.

The magnesia raw material providing the MgO has at least 90 ma.-% MgO, preferably 96 to 98 ma.-% MgO. The alumina raw material providing the $Al_2O_3$ can also be pure alumina and/or bauxite, which is part of the coarse fraction of the batch. In this case, however, the two aforementioned raw materials provide no more than 10 ma.-% of the $Al_2O_3$ content of the entire composition. The coarse fraction also has grain sizes up to 4.7 mm.

U.S. Pat. No. 4,954,463 discloses a refractory batch for the in-situ formation of magnesium aluminate spinel, the batch comprising 65 to 99 ma.-% magnesia with an MgO content of at least 92 ma.-% and 35 to 1 ma.-% sintered bauxite with an $Al_2O_3$ content of at least 83 ma.-% and an $SiO_2$ content of less than 7 ma.-%. Thereby, the total $SiO_2$ content of the batch is less than 4 ma.-%. According to the examples of U.S. Pat. No. 4,954,463, the batch contains 10 to 20 ma.-% of sintered bauxite with a grain size smaller than 0.224 mm.

DE 43 19 741 C2 discloses a process for the production of refractory products on the basis of magnesium oxide, starting from sintered and/or fused magnesia granular material containing at least 95 ma.-% MgO. The magnesia granular material is mixed with porous aluminum oxide granular material of a size of at least 0.5 mm, shaped and fired. Preferably, calcined alumina is used as the alumina raw material. Also named are tabular alumina and fused alumina. Preferably, the alumina raw material also has an $Al_2O_3$ content of at least 97 ma.-%. According to DE 43 19 741 C2, the high purity ensures a high refractoriness of the bricks made from it.

Furthermore, it is known from WO 2004/056718 A2 to use as elastifier component a calcium aluminate with a $CaO/Al_2O_3$ ratio between 0.14 and 0.2, in particular of the chemical formula $CaAl_{12}O_{19}$. Preferably, the elastifier component has the oxide formula $CaO \cdot 6\ Al_2O_3$ or the short formula $CA_6$.

According to WO 2007/096246 A2, a forsterite material or a mixture forming a forsterite material is used as the elasticizing additive.

The object of the present invention is to provide a batch for the production of a coarse ceramic refractory basic shaped product, wherein the product shall have good thermal shock resistance as well as sufficient temperature resistance and shall be cost effective to produce.

A further object of the invention is to provide a product made from the batch, a method of making it, and a lining of an industrial furnace having such a product and an industrial furnace having such a lining.

These problems are solved by a batch having the features of claim 1, a product having the features of claim 16, a method having the features of claim 29, a lining having the features of claim 31, and an industrial furnace having the features of claim 35. Advantageous further embodiments of the invention are characterized in the respective following subclaims.

The problem is solved in particular by a dry batch for the production of a coarse ceramic, refractory, shaped, fired or unfired magnesia spinel product, in particular for a working casing or a backing of a large-volume industrial furnace, preferably a cement kiln, a lime shaft or lime rotary kiln, a magnesite or dolomite kiln, or a heating kiln or a kiln for energy production or a steel production kiln or a kiln of the non-ferrous metal industry, comprising a dry substance mixture consisting of a) a granular magnesia component of at least one magnesia with an MgO content<91.5 ma.-%, preferably <90 ma.-%, particularly preferably <89 ma.-%, as main component, and b) a granular elastifier component in an amount of 2 to 10 ma.-%, preferably of 3 to 8 ma.-%, particularly preferably of 4 to 6 ma.-%, of at least one sintered bauxite, the elastifier component having a grain size according to DIN 66165-2:2016-08≤2.5 mm, preferably ≤2 mm, and the elastifier component having grains with a grain size according to DIN 66165-2:2016-08 of ≤0.5 mm at most in an amount of ≤25 ma.-%, preferably ≤20 ma.-%, especially≤15 ma.-%.

Preferably, the MgO content of the main component is <90 ma.-%, more preferably <89 ma.-%.

The dry batch may also have another granular magnesia component of at least one magnesia with a higher MgO content than the main component.

Consequently, the problem is also solved by a dry batch for the production of a coarse ceramic, refractory, shaped, fired or unfired magnesia spinel product, in particular for a working casing or a backing of a large-volume industrial furnace, preferably a cement kiln, a lime shaft or lime rotary kiln, a magnesite or dolomite kiln, or a heating kiln or a kiln for energy production or a kiln of steel production or a kiln of the non-ferrous metal industry, comprising a dry substance mixture consisting of a) a granular magnesia component of at least one magnesia having an MgO content<91.5 ma.-%, preferably <90 ma.-%, particularly preferably <89 ma.-%, as the main component in an amount of ≥70 ma.-%, preferably an amount of ≥85 ma.-%, b) a granular elastifier component in an amount of 2 to 10 ma.-%, preferably of 3 to 8 ma.-%, particularly preferably of 4 to 6 ma.-%, of at least one sintered bauxite, the elastifier component having a grain size according to DIN 66165-2:2016-08≤2.5 mm, preferably of ≤2 mm, and the elastifier component having grains with a grain size according to DIN 66165-2:2016-08 of ≤0.5 mm at most in an amount of ≤25 ma.-%, preferably ≤20 ma.-%, preferably ≤15 ma.-%, and c) a further granular magnesia component of at least one magnesia with a higher MgO content than the main component.

According to a preferred embodiment, the main component has an MgO content<90 ma.-% and the averaged MgO content of all magnesia grades of the dry substance mixture taken together is 91.5 ma.-%.

According to another preferred embodiment, the main component has an MgO content of 85 to <90 ma.-% and the averaged MgO content of all the magnesia grades of the dry substance mixture taken together is ≤91.5 ma.-%.

According to another preferred embodiment, the main component has a MgO content<89 ma.-% and the averaged MgO content of all magnesia grades of the dry substance mixture taken together is ≤91.5 ma.-%, preferably ≤90 ma.-%.

According to another preferred embodiment, the main component has a MgO content of 87 to <89 ma.-% and the averaged MgO content of all magnesia grades of the dry substance mixture taken together is ≤91.5 ma.-%, preferably ≤90 ma.-%.

In the following, the invention is explained in more detail with the aid of a drawing by way of example. It shows:

FIG. 1: A light microscope image of an elastifier grain formed from sintered bauxite in a brick according to the invention after production firing FIG. 2: Distribution of Al and Mg in an elastifier grain formed from sintered bauxite in a brick according to the invention (left) and in an elastifier grain formed from alumina in a brick not according to the invention (right)

Figure 3:
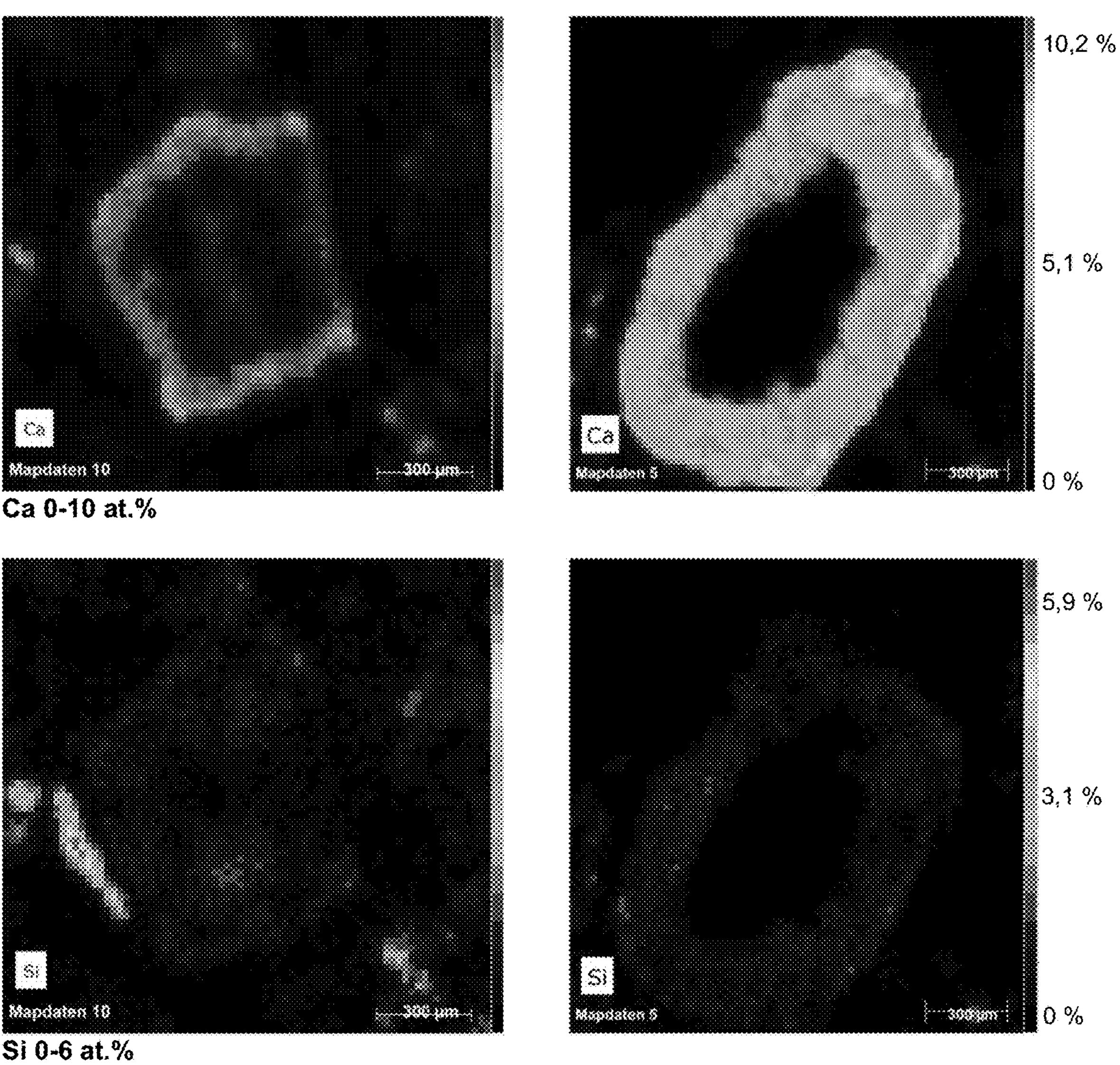

FIG. 3: Distribution of Ca and Si in the elastifier grain formed from sintered bauxite in the brick according to the invention (left) and in the elastifier grain formed from alumina in a brick not according to the invention (right)

In the course of the invention, it was surprisingly found that it is possible to produce a magnesia spinel product with good mechanical and thermomechanical properties and sufficient refractoriness from a batch containing a mineral dry substance mixture, which contains an impure granular magnesia component as the main component, if an elastifier component of sintered bauxite is used for in situ elastification.

Here, impure means that the magnesia component consists of at least one magnesia with an MgO content of only<91.5 ma.-%, preferably <90 ma.-%, particularly preferably <89 ma.-%. According to the invention, the granular, impure magnesia component is present in the dry substance mixture of the batch in an amount of ≥70 ma.-%, preferably ≥85 ma.-%.

The MgO content of the impure magnesia is thus preferably 85 to <91.5 ma.-% according to the invention, preferably 85 to <90 ma.-%, particularly preferably 87 to <89 ma.-%.

Unless otherwise specified, the MgO content, the $Al_2O_3$ content, the $SiO_2$ content and the content of the unwanted oxides of the raw materials are determined by X-ray fluorescence analysis according to DIN EN ISO 12667:2013-2.

In addition, the at least one magnesia of the impure magnesia component is preferably a crushed granular material. Preferably, the magnesia of the impure magnesia component consists exclusively of crushed granular material(s).

Generally, the refractoriness decreases if impure raw materials are used. This is because the impure raw materials contain a relatively high amount of unwanted oxides or secondary constituents or impurities. Magnesia contains in particular CaO, $SiO_2$ as well as $Fe_2O_3$ as unwanted oxides. These impurities can affect the reactions taking place in-situ during the firing process in a detrimental manner. Structural defects and reduced refractory strengths are the result. Cracking beyond the desired microcracks can lead to strength losses that cause spalling in service. Thus, the skilled man is generally discouraged from using impure raw materials, even though they are usually less expensive.

Within the scope of the invention, it has now surprisingly been found that a magnesia spinel product with good mechanical and thermomechanical properties and sufficient refractoriness can be obtained if a granular elastifier component of at least one sintered bauxite is used for in-situ MA spinel formation. According to the invention, the elastifier component is contained in the dry substance mixture of the batch in an amount of 2 to 10 ma.-%, preferably of 3 to 8 ma.-%, particularly preferably of 4 to 6 ma.-%, in relation to the dry mass of the dry substance mixture.

Furthermore, according to the invention, the elastifier component has a grain size according to DIN 66165-2:2016-08≤2.5 mm, preferably ≤20 mm.

In addition, it was found according to the invention that the fines content of the elastifier component must not be too high. This is because the reactive fines content can lead to a modified mineral phase composition in the binder phase.

According to the invention, the elastifier component comprises grains with a grain size according to DIN 66165-2:2016-08 of ≤0.5 mm at most in an amount of up to 25 ma.-%, preferably up to 20 ma.-%, particularly preferably up to 15 ma.-%. Or the amount of grains with a grain size according to DIN 66165-2:2016-08 of ≤0.5 mm is 0 to 25 ma.-%, preferably 0 to 20 ma.-%, particularly preferably 0 to 15 ma.-%.

Preferably, for the above-mentioned reason, the elastifier component also has grains with a grain size according to DIN 66165-2:2016-08 of ≤0.2 mm at most in an amount of up to 10 ma.-%, preferably up to 7 ma.-%, particularly preferably up to 5 ma.-%. Or the amount of grains with a grain size according to DIN 66165-2:2016-08 of ≤0.2 mm is 0 to 10 ma.-%, preferably 0 to 7 ma.-%, particularly preferably 0 to 5 ma.-%.

Furthermore, the elastifier component preferably has grains with a grain size according to DIN 66165-2:2016-08 of >2 mm at most in an amount 25 ma.-%, preferably ≤20 ma.-%, particularly preferably ≤10 ma.-%. Or the amount of grains with a grain size according to DIN 66165-2:2016-08 of >2 mm is preferably 0 to 25 ma.-%, especially 0 to 20 ma.-%, particularly preferably 0 to 10 ma.-%.

The above amounts refer, of course, to the total amount of elastifier component.

In addition, the at least one sintered bauxite is also preferably a crushed granular material. Preferably, the elastifier component comprises exclusively crushed granular material(s).

It was particularly surprising that it is possible to produce a magnesia spinel product with good mechanical and thermomechanical properties and sufficient refractoriness from two impure raw materials, namely an impure magnesia and an impure alumina raw material, namely the sintered bauxite. This is because the sintered bauxite in itself is an impure alumina raw material compared to alumina and preferably has an $Al_2O_3$ content of only 70 to 92 ma.-%, preferably 78 to 91 ma.-%. Thus, due to the high content of unwanted oxides in both the magnesia raw material and the sintered bauxite, it would actually have been expected that no good mechanical, thermomechanical properties and refractories could be achieved.

Surprisingly, it was also found in the context of the invention that no good properties can be achieved with purer alumina raw materials. This will be discussed in more detail within the exemplary embodiments.

Preferably, the at least one magnesia of the main component is sintered magnesia or fused magnesia. Preferably, it is sintered magnesia.

In addition, the at least one magnesia of the main component preferably comprises the following properties, which may be accomplished individually or in any combination according to the invention:

TABLE 1

Secondary oxide contents of the magnesia of the main component

| | | preferably |
|---|---|---|
| $SiO_2$ content [ma.-%] | 0.5 to 3 | 0.7 to 2.5 |
| CaO content [ma.-%] | 0.5 to 4 | 1.0 to 3.5 |
| $Fe_2O_3$ content [ma.-%] | 0.2 to 10.0 | 0.5 to 9.5 |
| MnO content [ma.-%] | 0 to 1.5 | 0.1 to 0.7 |

Furthermore, the main component comprises a grain size distribution which is usual for the production of a coarse ceramic magnesia spinel product, preferably a magnesia spinel brick. That means, the main component comprises both a fine grain portion and a coarse grain portion. Thereby, both the fine grain portion and the coarse grain portion preferably comprise a continuous grain size distribution.

In the context of the invention, fine grain portion refers to all granular materials≤1 mm. The coarse grain portion comprises grain sizes>1 mm.

Preferably, the main component also comprises a maximum grain size≤7 mm, preferably ≤6.5 mm.

It is also advantageous if the impure magnesia has a high $Fe_2O_3$ content. This is because it has been found that the magnesioferrite contained in the magnesia is a stable phase which does not disturb the microstructure. This may have a favorable effect on strength and depositing behavior. Preferably, the impure magnesia has an $Fe_2O_3$ content of 0.2 to 10 ma.-%, preferably 0.5 to 9.5 ma.-%.

As already explained, the elastifier component consists of at least one sintered bauxite (=refractory bauxite). Sintered bauxite is a significantly less pure alumina raw material than, for example, alumina. It is therefore all the more surprising that it was found within the invention that significantly better properties of the products made from the batch can be achieved when sintered bauxite is used than when alumina is used. At the same time, sintered bauxite is also a relatively inexpensive alumina raw material.

The at least one sintered bauxite of the elastifier component preferably has the following properties, which can be accomplished individually or in any combination according to the invention:

TABLE 2

Properties of the sintered bauxite of the elastifier component

| | | preferably |
|---|---|---|
| $SiO_2$ content [ma.-%] | 4 to 20 | 6 to 15 |
| CaO content [ma.-%] | 0.1 to 1.5 | 0.2 to 0.5 |
| $Fe_2O_3$ -content [ma.-%] | 0.5 to 4 | 0.9 to 2 |
| $TiO_2$ content [ma.-%] | 0.5 to 4 | 2 to 3.5 |

In principle, it can be assumed that the refractoriness decreases with increasing CaO and/or $SiO_2$ content, so that the skilled person is rather discouraged from using such a raw material as an elastifier component.

Furthermore, the elastifier component has a grain size distribution within the specified range. The grain size distribution is preferably continuous.

Furthermore, the batch according to the invention may contain a further granular magnesia component in addition to the main component. The further magnesia component consists of at least one magnesia with a higher MgO content than the MgO content of the main component. Preferably, the further granular magnesia component is present in the dry substance mixture in an amount of 5 to 28 ma.-%, preferably 10 to 22 ma.-%, in relation to the dry mass of the dry substance mixture.

The averaged MgO content of all magnesia grades of the dry substance mixture taken together, that means of the main component and, if present, of the further magnesia component taken together, is thereby preferably 85 to 91.5 ma.-%, especially 87 to 90 ma.-%, particularly preferably 87 to 89 ma.-%.

Or, the averaged MgO content of all magnesia grades of the dry substance mixture taken together, that means of the main component and, if present, of the further magnesia component taken together, is preferably ≤91.5 ma.-%, especially ≤90 ma.-%, in particular ≤89 ma.-%.

In addition, the at least one magnesia of the further granular magnesia component is also preferably a crushed granular material. Preferably, the further granular magnesia component comprises exclusively crushed granular material(s).

Preferably, the dry substance mixture comprises exclusively crushed granular material(s).

In particular, all the magnesia grades taken together, i.e. the main component and, if present, the further magnesia component taken together, have a, preferably continuous, grain distribution which is usual for the production of a coarse ceramic magnesia spinel product, preferably a magnesia spinel brick. That means, the magnesia grades together have both a fine grain portion and a coarse grain portion. Thereby, both the fine grain portion and the coarse grain portion preferably comprise a continuous grain distribution.

Preferably, the magnesia grades also comprise a maximum grain size≤7 mm, preferably ≤6.5 mm.

The $CaO/SiO_2$ ratio of all the components of the dry substance mixture taken together is preferably 1.2 to 3.0, preferably 1.5 to 2.5. To determine the $CaO/SiO_2$ ratio of all the components, the CaO or $SiO_2$ content of the individual components is added together respectively and the CaO/$SiO_2$ ratio is calculated therefrom.

The averaged MnO content of all components of the dry batch is also preferably <1.0 ma.-%, preferably <0.8 ma.-%.

Preferably, the batch does not comprise a raw material consisting mainly of MnO or $MnO_2$ or $Mn_2O_3$.

As already explained, it has surprisingly appeared that refractory products made from the batch according to the invention comprise a good thermal shock resistance (TSR), a low E- and G-modulus, as well as good cold compressive strength and good cold bending strength, while comprising at the same time a good refractoriness.

For the production of the refractory products, the batch according to the invention can comprise at least one dry or solid binder in addition or additive to the mineral dry substance mixture. Additive means the amount of binder is added additively and refers to the total dry mass of the dry substance mixture.

The batch according to the invention preferably contains the dry binder in a total amount of 0 to 4 ma.-%, preferably 0 to 3 ma.-%, in relation to the dry mass of the dry substance mixture.

The at least one dry binder is a binder suitable for refractory products. These binders are specified, for example, in the Practice Manual, page 28/item 3.2.

Furthermore, the batch may also contain, in addition or additive to the mineral dry substance mixture, at least one dry additive for refractory materials, preferably in a total amount<5 ma.-% (=0 to <5 wt %), preferably <3 ma.-% (=0 to <3 ma.-%), in relation to the dry substance mixture.

The dry additive is an additive suitable for refractory products. The additive can be mineral or chemical. Suitable additives are specified, for example, in the Practice Manual, page 28/item 3.3. They are used to improve processability or formability or to modify the microstructure of the products and thus achieve special properties. Preferably, however, the batch does not contain any additive.

It goes without saying that the amount of the dry substance mixture in the batch is high enough so that a magnesia spinel product can be produced therefrom. Preferably, the batch according to the invention consists of at least 90% by weight, especially of at least 95% by weight, particularly preferably of at least 98% by weight, in particular of 100% by weight, of the dry substance mixture, in relation to the total mass of the batch.

For the production of shaped magnesia spinel products, in particular magnesia spinel bricks, from the batch according to the invention, a mixture or pressed mass or batch fresh mass is prepared from the dry batch with at least one liquid binder and/or water. If the batch contains a liquid binder, the addition of water is not necessary, but possible. In addition, the addition of liquid binder is not necessary but possible if the batch contains at least one dry binder.

The total amount of liquid binder in the batch fresh mass or pressed mass is preferably 2 to 6 ma.-%, preferably 3 to 5 ma.-%, in relation to the dry mass of the dry substance mixture.

Preferably, the at least one liquid binder is a binder from the following group: thermosetting synthetic resin binder, in particular phenol-formaldehyde resin, or molasses or lignin sulfonate, or a sulfur-free binder, in particular a binder on the basis of dextrose, an organic acid, saccharose, an $Al_2O_3$ binder, phosphoric acid, a phosphate binder, water glass, ethyl silicate, or a sulfate, for example magnesium sulfate or aluminum sulfate, or a sol-gel system.

Optionally, at least one liquid additive can also be added, which is also added additively to the dry substance mixture.

The liquid additive is, for example, a wetting agent.

The total amount of liquid additive in the batch fresh mass is preferably <1.0 ma.-% (=0 to <1 ma.-%), especially <0.5 ma.-% (=0 to <0.5 ma.-%), in relation to the dry mass of the dry substance mixture.

For an optimal distribution of the binder(s) and/or the water and, optionally, the at least one additive, mixing is carried out for e.g. 3 to 10 minutes.

The mixture is placed in molds and pressed so that shaped bodies are formed. The pressing powers are in usual ranges, e.g. 60-180 MPa, preferably 100-150 MPa.

Preferably, drying is carried out after pressing, e.g. between 60 and 200° C., in particular between 90 and 140° C. Drying is preferably carried out to a residual moisture content of between 0.1 and 0.6 ma.-%, in particular between 0.2 and 0.5 ma.-%, determined in accordance with DIN 51078:2002-12.

The shaped bodies according to the invention, in particular the bricks, can be used unfired or tempered or fired. Preferably, however, they are used fired.

The green pressed bricks are tempered in a ceramic burning kiln, e.g. a tunnel kiln, between 200 and 800° C., in particular between 500 and 800° C.

For firing, the, preferably dried, pressed bricks are ceramically fired in a ceramic burning kiln, e.g. a tunnel kiln, preferably between >800 and 1800° C., in particular between 1400 and 1700° C. Preferably, it is being fired oxidizing, but depending on the material composition, reducing firing may also be advantageous.

The fired, shaped products, in particular the bricks, comprise a very good cold compressive strength according to DIN EN 993-5:1998-12 preferably of 40 to 120 MPa, in particular 50 to 90 MPa.

The cold bending strength according to DIN EN 993-6:1995-04 of the fired, shaped products according to the invention, in particular of the bricks, is preferably 3 to 10 MPa, in particular 4 to 7 MPa.

Furthermore, the fired, shaped products, in particular the bricks, preferably have a refractoriness under load value $T_{0.5}$ according to DIN EN ISO 1893:2008-09 of 1100 to 1750° C., especially 1200 to 1600° C.

Furthermore, the fired, shaped products, in particular the bricks, preferably have a compression $Z_{max}$ at 1700° C. according to DIN EN ISO 1893:2008-09 of 0.5 to 5 lin.-%, especially 1 to 4 lin.-%.

In addition, the fired shaped products according to the invention, in particular the bricks, preferably have a E-modulus (modulus of elasticity) from 15 to 35 GPa, especially from 18 to 30 GPa.

The G-modulus (shear modulus) of the fired shaped products according to the invention, in particular of the bricks, is preferably 7 to 16 GPa, especially 8 to 14 GPa.

The E-modulus and G-modulus were determined with the GrindoSonic MK6.

The thermal shock resistance determined according to DIN EN 993-11:2008-03 with air at an elevated test temperature of 1200° C. of the fired, shaped products according to the invention, in particular the bricks, is preferably >30 quenching cycles, in particular >50 quenching cycles.

The fired, shaped products, in particular the bricks, also preferably have an open porosity of 12 to 28 vol. %, preferably 13 to 20 vol. %, determined according to DIN EN 993-1:1995-04.

And/or they preferably have a raw density of 2.60 to 3.15 $g/cm^3$, in particular 2.75 to 3.10 $g/cm^3$, determined according to DIN 993-1:1995-04.

All the above properties of the products according to the invention, including of the batch, are each individually and in any combination according to the invention.

The good mechanical and thermal properties result in particular from the fact that no microstructural disturbances occur during firing. This is also shown in particular by the fact that no significant volume increase occurs during firing.

The invention is illustrated by the following examples:

In a first series of tests, bricks were produced from two different pure magnesia grades with an MgO content >94 ma.-% as comparative examples. Alumina (BSA=Brown Sintered Alumina) with an $Al_2O_3$ content of 96.5 ma.-% was used as the elastifier component.

In a second series of tests, bricks were produced from an impure magnesia with an MgO content <88 ma.-% as further comparative examples. Again, the alumina with an $Al_2O_3$ content of 96.5 ma.-% was used as the elastifier component.

In a third series of tests, bricks were produced from the two pure magnesia grades and the impure magnesia as comparative examples. Two different sintered bauxites with an $Al_2O_3$ content of 90.5 ma.-% and 79.6 ma.-%, respectively, and in a grain fraction of 0-1 mm were used as elastifier component.

In a fourth series of tests, bricks according to the invention were produced from the impure magnesia and the two sintered bauxites with grain fractions according to the invention.

The properties of the raw materials used are listed in the tables below:

TABLE 3

Properties of the used magnesia raw materials

| | DBM 1 | DBM 2 | DBM 3 |
|---|---|---|---|
| grain bulk density D $g/cm^3$ | 3.28 | 3.19 | 3.33 |
| chem. analysis mass-% | | | |
| $SiO_2$ | 0.89 | 2.11 | 0.58 |
| $Al_2O_3$ | 0.14 | 0.48 | 0.26 |
| $Fe_2O_3$ | 0.84 | 0.99 | 8.05 |
| $Cr_2O_3$ | 0.01 | 0.02 | 0.01 |
| MnO | 0.08 | 0.07 | 0.46 |

TABLE 3-continued

Properties of the used magnesia raw materials

| | DBM 1 | DBM 2 | DBM 3 |
|---|---|---|---|
| $TiO_2$ | 0.01 | 0.02 | 0.01 |
| $P_2O_5$ | 0.18 | 0.11 | 0.05 |
| GaO | 2.20 | 1.68 | 2.57 |
| MgO | 95.58 | 94.48 | 87.95 |
| $Na_2O$ | 0.02 | 0.02 | 0.02 |
| loss on ignition | 0.11 | 0.12 | 0.18 |
| C + S | 3.09 | 3.79 | 3.15 |
| C/S | 2.47 | 0.80 | 4.43 |

TABLE 4

Properties of the used alumina raw materials

| | alumina 96.5 | bauxite 1 | bauxite 2 |
|---|---|---|---|
| grain bulk density D $g/cm^3$ | 3.50 | 3.20 | 3.07 |
| chem. analysis mass-% | | | |
| $SiO_2$ | 0.90 | 4.57 | 13.57 |
| $Al_2O_3$ | 96.50 | 90.47 | 79.64 |
| $Fe_2O_3$ | 0.15 | 1.64 | 1.81 |
| MnO | 0.01 | 0.01 | 0.01 |
| $TiO_2$ | 1.20 | 2.90 | 3.20 |
| $P_2O_5$ | 0.02 | 0.07 | 0.29 |
| CaO | 0.01 | 0.03 | 0.55 |
| MgO | 0.30 | 0.05 | 0.22 |
| $Na_2O$ | 0.30 | 0.02 | 0.06 |
| loss on ignition | 0.05 | 0.12 | 0.18 |

The production of the bricks was carried out as follows:

A press mass was prepared from the respective batch. Mixing was carried out for 4 minutes for an optimal distribution of the binder. The press mass was placed in molds and pressed so that bricks were formed. After pressing, drying was carried out at 110° C. for a time of 8 h to a residual moisture content of 0.1 ma.-%, determined according to DIN 51078:2002-12. Subsequently, the bricks were fired oxidizing.

The batches used and the properties of the bricks produced from them, as well as the firing temperature, are given in the following tables. In the case of the sintered bauxite and alumina, the indicated grain sizes are grain fractions, and in the case of the magnesia grades, they are grain groups:

TABLE 5

Batches and results of test series 1

| | | firing temperature | |
|---|---|---|---|
| batch No.: | | 1430° C. V1a | 1430° C. V1b |
| binder | lignosulfonate (45% conc.) | 3.6 | 3.6 |
| format | mm | 70/65 × 200 × 220 | 70/65 × 200 × 220 |
| pressing power | MPa | 180 | 180 |
| DBM 1 | 2-4 | 27.0 | |
| DBM 1 | 1-2 | 20.0 | |
| DBM 1 | 0-1 | 14.0 | |
| DBM 1 | meal | 34.0 | |
| DBM 2 | 2-4 | | 27.0 |
| DBM 2 | 1-2 | | 20.0 |
| DBM 2 | 0-1 | | 14.0 |
| DBM 2 | meal | | 34.0 |
| alumina 96.5 | 0.5-1.0 | 5.0 | 5.0 |

TABLE 5-continued

Batches and results of test series 1

| batch No.: | | firing temperature 1430° C. V1a | 1430° C. V1b |
|---|---|---|---|
| comment | | prior art no cracks | prior art no cracks |
| finished bulk density | g/cm$^3$ | 2.92 | 2.80 |
| E modulus | GPa | 24.02 | 16.04 |
| G modulus | GPa | 11.41 | 8.15 |
| cold compr. strength | MPa | 87.25 | 51.45 |
| cold bending strength | MPa | 6.14 | 4.36 |
| porosity | Vol.-% | 16.68 | 19.23 |
| TSR, air, 1200° C. | cycles | 1/—/>30 | 1/—/>30 |
| shrinkage | lin.-% | −0.28 | −1.84 |
| refractoriness under load: $D_{max}$ | lin.-% | 1.79 | 1.51 |
| $T_0$ | ° C. | 1556 | 1331 |
| $T_{0.5}$ | ° C. | — | 1471 |
| $T_1$ | ° C. | — | 1523 |
| $T_2$ | ° C. | — | 1601 |
| $T_5$ | ° C. | — | — |
| $Z_{max}$ (1700° C.) | lin.-% | 0.21 | 4.76 |

TABLE 6

Batches and results of test series 2

| batch No.: | | firing temperature 1430° C. V2a | 1430° C. V2b | 1430° C. V2c | 1430° C. V2d |
|---|---|---|---|---|---|
| binder | lignosulfonate (45% conc.) | 3.6 | 3.6 | 3.6 | 3.6 |
| format | mm | 70/65 × 200 ×220 | 70/65 × 200 × 220 | 70/65 × 200 × 220 | 70/65 × 200 × 220 |
| pressing power | MPa | 180 | 180 | 180 | 180 |
| DBM 2 | meal | 20.0 | 20.0 | 20.0 | 20.0 |
| DBM 3 | 2-4 | 28.0 | 28.0 | 28.0 | 28.0 |
| DBM 3 | 1-2 | 23.0 | 23.0 | 23.0 | 23.0 |
| DBM 3 | 0-1 | 14.0 | 15.0 | 16.0 | 17.0 |
| DBM 3 | meal | 10.0 | 10.0 | 10.0 | 10.0 |
| bauxite 1 | 0.5-1.6 | | | | |
| bauxite 1 | 0.5-1.0 | | | | |
| alumina 96.5 | 0.5-1.0 | 5.0 | 4.0 | 3.0 | 2.0 |
| comment | | instable brick microstructure/brick damages | | | |
| | | light cracks | cracks | cracks | cracks |
| finished bulk density | g/cm$^3$ | 2.93 | 2.92 | 2.92 | 2.98 |
| E modulus | GPa | 14.11 | 14.78 | 15.38 | 23.27 |
| G modulus | GPa | 7.43 | 7.67 | 8.09 | 11.67 |
| cold compr. strength | MPa | 47.00 | 48.65 | 44.15 | 62.30 |
| cold bending strength | MPa | 3.91 | 3.40 | 3.95 | 4.56 |
| porosity | Vol.-% | 17.45 | 17.39 | 18.15 | 16.62 |
| TSR, air, 1200° C. | cycles | 1/—/>30 | 1/—/>30 | 1/—/>30 | 1/—/>30 |
| shrinkage | lin.-% | −1.06 | −1.64 | −1.44 | −0.56 |
| refractoriness under load: $D_{max}$ | lin.-% | 1.51 | n.b. | n.b. | n.b. |
| $T_0$ | ° C. | 1298 | (because of the microstructure failures/cracks not determined) | | |
| $T_{0.5}$ | ° C. | 1449 | | | |
| $T_1$ | ° C. | 1499 | | | |
| $T_2$ | ° C. | 1565 | | | |
| $T_5$ | ° C. | | | | |
| $Z_{max}$ (1700° C.) | lin.-% | 4.72 | | | |

TABLE 7

Batches and results of test series 3

| batch No.: | | firing temperature 1430° C. V3a | 1430° C. V3b | 1430° C. V3c | 1430° C. V3d | 1430° C. V3e | 1430° C. V3f |
|---|---|---|---|---|---|---|---|
| binder | lignosulfonate (45% conc.) | 3.6 | 2.6 | 2.6 | 2.6 | 2.6 | 2.6 |

TABLE 7-continued

| Batches and results of test series 3 | | | | | | | |
|---|---|---|---|---|---|---|---|
| format 70/65 × 200 × 220 | mm | X | X | X | X | X | X |
| pressing power | MPa | 180 | 180 | 180 | 180 | 180 | 180 |
| DBM 1 | 2-4 | 27.0 | 27.0 | 27.0 | 27.0 | 27.0 | |
| DBM 1 | 1-2 | 20.0 | 15.0 | 18.0 | 18.0 | 18.0 | |
| DBM 1 | 0-1 | 14.0 | 19.0 | 16.0 | 16.0 | 16.0 | |
| DBM 1 | meal | 34.0 | 34.0 | 34.0 | 34.0 | 34.0 | |
| DBM 2 | 2-4 | | | | | | 27.0 |
| DBM 2 | 1-2 | | | | | | 20.0 |
| DBM 2 | 0-1 | | | | | | 14.0 |
| DBM 2 | meal | | | | | | 34.0 |
| DBM 3 | 2-4 | | | | | | |
| DBM 3 | 1-2 | | | | | | |
| DBM 3 | 0-1 | | | | | | |
| DBM 3 | meal | | | | | | |
| bauxite 1 | 0-1 | 5.0 | | | 3.0 | | 5.0 |
| bauxite 1 | 1-2 | | 5.0 | | 2.0 | | |
| bauxite 1 | 0.5-1.6 | | | 5.0 | | | |
| bauxite 2 | 0-1 | | | | | 3.0 | |
| bauxite 2 | 1-2 | | | | | 2.0 | |
| comment | | | | | | | |
| finished bulk density | g/cm$^3$ | 2.93 | 2.90 | 2.89 | 2.89 | 2.87 | 2.93 |
| E modulus | GPa | 29.62 | 23.32 | 20.91 | 23.99 | 23.90 | 23.37 |
| G modulus | GPa | 14.32 | 11.51 | 10.35 | 11.58 | 12.27 | 13.05 |
| cold compr. strength | MPa | 112.30 | 79.00 | 70.60 | 77.60 | 74.20 | 111.20 |
| cold bending strength | MPa | 7.68 | 5.16 | 5.36 | 6.27 | 6.14 | 6.39 |
| porosity | Vol.-% | 15.86 | 17.65 | 17.54 | 17.37 | 17.08 | 16.37 |
| TSR, air, 1200° C. | cycles | 1/—/>30 | 1/—/>30 | 1/—/>30 | 1/—/>30 | 1/—/>30 | 1/—/>30 |
| shrinkage | lin.-% | −0.21 | 0.14 | 0.00 | 0.00 | 0.00 | −0.14 |
| refractoriness under load: $D_{max}$ | lin.-% | 1.90 | | | 1.81 | | 1.68 |
| $T_0$ | ° C. | 1462 | | | 1463 | | 1383 |
| $T_{0.5}$ | ° C. | 1678 | | | 1668 | | 1533 |
| $T_1$ | ° C. | — | | | — | | 1594 |
| $T_2$ | ° C. | — | | | — | | 1658 |
| $T_5$ | ° C. | — | | | — | | — |
| $Z_{max}$ (1700° C.) | lin.-% | 0.64 | | | 0.74 | | 3.25 |
| $T_f/Z_f$ | ° C./lin.-% | | | | | | |
| | | firing temperature | | | | | |
| batch No.: | | 1430° C. V3g | 1430° C. V3h | 1430° C. V3i | 1430° C. V3j | 1430° C. V3k | 1430° C. V3l |
| binder | lignosulfonate (45% conc.) | 2.6 | 2.6 | 2.6 | 2.6 | 2.6 | 2.6 |
| format 70/65 × 200 × 220 | mm | X | X | X | X | X | X |
| pressing power | MPa | 180 | 180 | 180 | 180 | 180 | 180 |
| DBM 1 | 2-4 | | | | | | |
| DBM 1 | 1-2 | | | | | | |
| DBM 1 | 0-1 | | | | | | |
| DBM 1 | meal | | | | | | |
| DBM 2 | 2-4 | 27.0 | 27.0 | 27.0 | 27.0 | | |
| DBM 2 | 1-2 | 15.0 | 18.0 | 18.0 | 18.0 | | |
| DBM 2 | 0-1 | 19.0 | 16.0 | 16.0 | 16.0 | | |
| DBM 2 | meal | 34.0 | 34.0 | 34.0 | 34.0 | 20.0 | 20.0 |
| DBM 3 | 2-4 | | | | | 28.0 | 28.0 |
| DBM 3 | 1-2 | | | | | 23.0 | 21.0 |
| DBM 3 | 0-1 | | | | | 14.0 | 16.0 |
| DBM 3 | meal | | | | | 10.0 | 10.0 |
| bauxite 1 | 0-1 | | | 3.0 | | 5.0 | 3.0 |
| bauxite 1 | 1-2 | 5.0 | | 2.0 | | | 2.0 |
| bauxite 1 | 0.5-1.6 | | 5.0 | | | | |
| bauxite 2 | 0-1 | | | | 3.0 | | |
| bauxite 2 | 1-2 | | | | 2.0 | | |
| comment | | | | | | | |
| finished bulk density | g/cm$^3$ | 2.93 | 2.95 | 2.93 | 2.92 | 3.02 | 3.04 |
| E modulus | GPa | 24.46 | 25.83 | 23.93 | 26.59 | 22.95 | 24.82 |
| G modulus | GPa | 13.85 | 14.48 | 13.15 | 14.81 | 12.94 | 13.67 |
| cold compr. strength | MPa | 108.30 | 112.01 | 113.00 | 110.70 | 96.30 | 102.70 |
| cold bending strength | MPa | 5.41 | 5.94 | 6.21 | 6.74 | 6.04 | 5.51 |
| porosity | Vol.-% | 16.30 | 15.49 | 16.42 | 16.57 | 15.24 | 14.71 |
| TSR, air, 1200° C. | cycles | 1/—/>30 | 1/—/>30 | 1/—/>30 | 1/—/>30 | 1/—/>30 | 1/—/>30 |
| shrinkage | lin.-% | 0.00 | −0.07 | −0.04 | 0.11 | 0.28 | 0.42 |
| refractoriness under load: $D_{max}$ | lin.-% | | | 1.73 | | 1.69 | 1.74 |
| $T_0$ | ° C. | | | 1371 | | 1349 | 1358 |
| $T_{0.5}$ | ° C. | | | 1521 | | 1448 | 1496 |
| $T_1$ | ° C. | | | 1579 | | 1502 | 1571 |

TABLE 7-continued

| Batches and results of test series 3 | | | | |
|---|---|---|---|---|
| $T_2$ | ° C. | 1653 | 1571 | 1639 |
| $T_5$ | ° C. | — | 1638 | — |
| $Z_{max}$ (1700° C.) | lin.-% | 3.26 | failure! | failure! |
| $T_f/Z_f$ | ° C./lin.-% | | 1638 | 1686 |

TABLE 8

| Batches and results of test series 4 | | | | | | | | |
|---|---|---|---|---|---|---|---|---|
| | | firing temperature | | | | | | |
| batch No.: | | 1430° C.<br>V4a | 1430° C.<br>V4b | 1430° C.<br>V4c | 1430° C.<br>V4 d | 1430° C.<br>V4e | 1430° C.<br>V4f | 1430° C.<br>V4g |
| binder | lignosulfonate (45% conc.) | 3.6 | 3.6 | 3.6 | 3.4 | 3.6 | 3.6 | 3.6 |
| format | mm | 70/65 × 200 × 220 | 70/65 × 200 × 220 | 70/65 × 200 × 220 | 70/65 × 200 × 220 | 70/65 × 200 × 220 | 70/65 × 200 × 220 | 70/65 × 200 × 220 |
| pressing power | MPa | 180 | 180 | 180 | 120 | 180 | 180 | 180 |
| DBM 2 | meal | 20.0 | 20.0 | 20.0 | 20.0 | 20.0 | 20.0 | 20.0 |
| DBM 3 | 2-4 | 28.0 | 28.0 | 28.0 | 28.0 | 28.0 | 28.0 | 28.0 |
| DBM 3 | 1-2 | 23.0 | 23.0 | 21.5 | 23.0 | 22.0 | 23.0 | 23.0 |
| DBM 3 | 0-1 | 15.0 | 14.5 | 14.5 | 15.0 | 12.0 | 14.0 | 14.0 |
| DBM 3 | meal | 10.0 | 10.0 | 10.0 | 10.0 | 10.0 | 10.0 | 10.0 |
| bauxite 1 | 2-2.5 | | | | | | 1.0 | |
| bauxite 1 | 1-2 | | | | | | 1.0 | |
| bauxite 1 | 0.5-1.6 | | | 6.0 | | | | |
| bauxite 1 | 0.5-1 | 4.0 | 4.5 | | 4.0 | 8.0 | 2.0 | |
| bauxite 1 | 0.2-0.5 | | | | | | 1.0 | |
| bauxite 2 | 2-2.5 | | | | | | | 1.0 |
| bauxite 2 | 1-2 | | | | | | | 1.0 |
| bauxite 2 | 0.5-1 | | | | | | | 2.0 |
| bauxite 2 | 0.2-0.5 | | | | | | | 1.0 |
| | | bricks according to the invention | | | | | | |
| | | no cracks | no cracks | no cracks | no cracks | no cracks | no cracks | no cracks |
| finished bulk density | g/cm³ | 3.04 | 3.03 | 3.02 | 2.97 | 2.99 | 3.03 | 3.02 |
| E modulus | GPa | 25.36 | 22.28 | 19.10 | 21.06 | 16.43 | 23.37 | 23.38 |
| G modulus | GPa | 12.88 | 11.58 | 10.18 | 10.68 | 9.46 | 13.74 | 14.08 |
| cold compr. strength | MPa | 102.95 | 95.50 | 83.40 | 75.30 | 85.55 | 99.35 | 95.10 |
| cold bending strength | MPa | 5.88 | 5.23 | 4.68 | 4.63 | 4.71 | 5.70 | 5.58 |
| porosity | Vol.-% | 14.92 | 14.56 | 14.85 | 17.02 | 16.05 | 14.91 | 14.86 |
| TSR, air, 1200° C. | cycles | 1/—/>30 | 2/—/>30 | 2/—/>30 | 1/—/>30 | 1/—/>30 | 1/—/>30 | 1/—/>30 |
| shrinkage | lin.-% | 0.13 | 0.25 | 0.08 | 0.33 | −0.28 | 0.21 | 0.28 |
| refractoriness under load: $D_{max}$ | lin.-% | 1.76 | 1.71 | 1.63 | 1.80 | 1.68 | 1.67 | 1.65 |
| $T_0$ | ° C. | 1358 | 1342 | 1340 | 1324 | 1364 | 1332 | 1328 |
| $T_{0.5}$ | ° C. | 1578 | 1481 | 1524 | 1481 | 1513 | 1542 | 1511 |
| $T_1$ | ° C. | 1653 | 1550 | 1593 | 1549 | 1572 | 1613 | 1581 |
| $T_2$ | ° C. | — | 1647 | 1676 | 1633 | 1667 | 1700 | 1637 |
| $T_5$ | ° C. | — | — | — | — | — | — | — |
| $Z_{max}$ (1700° C.) | lin.-% | 1.53 | 2.95 | 2.49 | 3.83 | 3.36 | 2.04 | 3.47 |

The results of test series 1 show that bricks with good mechanical properties and good refractoriness could be readily produced from the two pure magnesia grades and the alumina.

The bricks of test series 2 from the impure magnesia and the alumina, on the other hand, surprisingly did not comprise good mechanical strengths. The bricks grew significantly during firing. This resulted in significant microstructural defects (cracks). The bricks did not have good strengths due to the microstructural defects.

In test series 3 it appeared that when the sintered bauxites were used in form of too fine granular materials in combination with the impure magnesia, it was not possible to achieve sufficient refractoriness.

In test series 4, numerous bricks according to the invention with good mechanical properties and good refractoriness were produced. Thereby, the content of sintered bauxite was varied. In addition, according to the invention, only grain fractions according to the invention with a low amount of granular material <0.5 mm were used.

During production firing, the bricks according to the invention shrank moderately. The strengths of the bricks according to the invention correspond to typical magnesia spinel bricks. The refractoriness (refractoriness under load) is advantageous for a brick for the firing zone of an industrial furnace, since such thermoplastic behavior can be utilized when used in mechanically loaded furnaces.

In the context of the invention, it is assumed that the surprisingly good properties of the bricks according to the invention result, among other things, from the formation of a transition zone (=reaction zone) between the MgO matrix and the elastifier grains. To prove this, the bricks were examined by light microscopy, X-ray diffraction and micro X-ray fluorescence spectrometry. The analysis of the individual elastifier grains with micro X-ray fluorescence spectrometry allows a spatial resolution of the elemental distribution.

FIG. 1 shows a light microscope image of an elastifier grain 1 formed from the sintered bauxite with 90.5 ma.-% $Al_2O_3$ in an MgO matrix 2 of a brick according to the invention. An inner ring 3 and an outer ring 4 formed around the elastifier grain 1 and forming the transition zone or reaction zone, can be clearly seen. In addition, pores 5 can be seen.

The results of X-ray powder diffraction are shown in the following table:

| mineral phase content (qualitative) | | |
|---|---|---|
| | test | |
| comment | V2a not according to the invention | V4b according to the invention |
| periclase (M) | ++++ | ++++ |
| spinel (MA) | + | + |
| corundum (A) | ± | ± |
| magnesioferrite (MF) | + | + |
| belite ($C_2S$) | ± | ± |
| merwinite ($C_3M_S2$) | ± | ± |
| hibonite ($CA_6$) | ± | − |

++++ = main phase
+ = detected
± = trace
− = not detected

From the results of X-ray diffraction and micro-X-ray fluorescence spectrometry it can be deduced that the inner ring 3 contains spinel, which was formed during firing by a reaction of the magnesia with the elastifier grain 1 at its edge region. The outer ring additionally contains the impurities or unwanted oxides contained in the sintered bauxite. It is assumed that the reaction of the elastifier grain 1 with the magnesia is stopped due to the formation of the outer ring 4 and, as a result, the increase in volume during firing is prevented and the bricks are therefore not damaged.

X-ray powder diffraction also showed that not only in-situ spinel but also hibonite ($CA_6$) formed due to the high CaO contents in the brick with the alumina. The formation of hibonite ($CA_6$) is usually undesirable because it leads to an increase in volume. From the results of micro X-ray fluorescence spectrometry, it can be derived that hibonite ($CA_6$) was formed in the transition zone. In contrast, no hibonite ($CA_6$) was detectable in the brick according to the invention.

Figure 2:
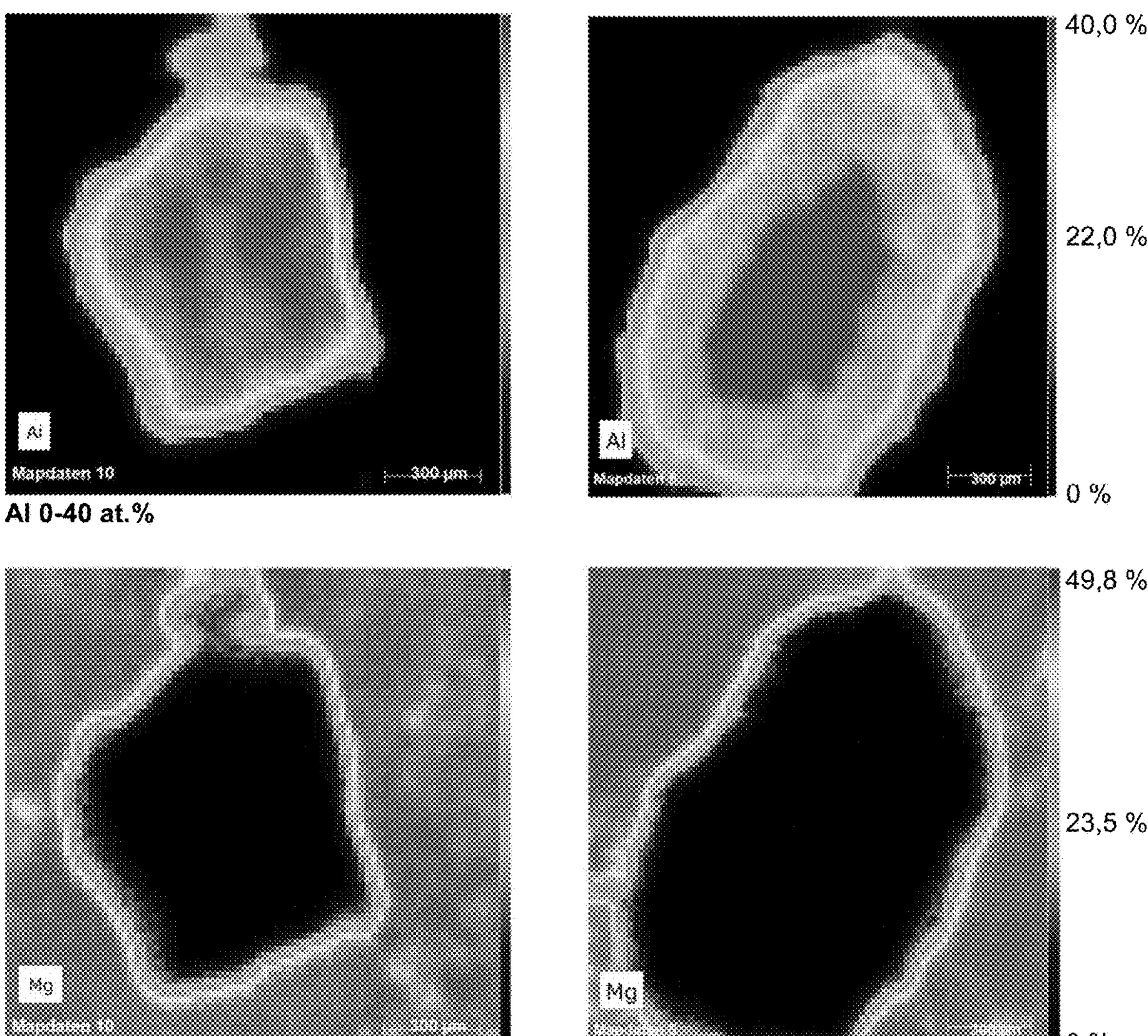

FIGS. 2 and 3 show the distribution of Al, Mg, Ca and Si in and around an elastifier grain of sintered bauxite containing 90.5 ma.-% Al2O3 (left) and in and around an elastifier grain of the alumina (right) after ceramic firing at 1430° C., as determined by micro X-ray fluorescence spectrometry. For com-parability, the same scaling (At. %) was used for the representation of the respective elements in both cases.

Depending on the alumina raw material used, differences can be seen in the formation of the respective transition zone.

In the case of the alumina, the area between the chemically hardly modified core and the outer ring of spinel is significantly wider than when using the sintered bauxite. In the case of the alumina, an enrichment of CaO and $SiO_2$ is particularly noticeable in the transition zone.

In the case of the alumina, a zone of calcium aluminate has also developed (10-14% CaO), which in turn is surrounded by a CaO-free rim of MA spinel (34% MgO). In the zone of calcium aluminate $SiO_2$ is enriched (up to 2.8%), but not in the surrounding ring of MA spinel.

In the case of sintered bauxite, a continuous decrease in the $SiO_2$ content can be observed from the center to the edge. The enrichment of CaO in the transition region is to a significantly lesser extent than in the case of the alumina. Here, too, a ring of MA spinel adjoins. The $SiO_2$ content within the elastifier grain varies in the range of 12-22% for the sintered bauxite. Comparatively low $Al_2O_3$ contents indicate that, in addition to the radiographically detected MA spinel phase, significant amounts of melilite ($C_2AS$) and merwinite ($C_3MS_2$) were formed, which may be present as a melt phase at the selected firing temperatures. Thus, in the case of sintered bauxite, the activity of CaO is probably reduced by the $SiO_2$ content in the raw materials due to the formation of melt phases and/or calcium-magnesium silicates or calcium-aluminum silicates. This prevents the undesirable formation of hibonite ($CA_6$) and prevents an increase in volume during firing. The sintered bauxite buffers the reaction to hibonite ($CA_6$) via the formation of secondary phases and is consequently less reactive.

The invention claimed is:

1. A dry batch for the production of a coarse ceramic, refractory, shaped, fired or unfired magnesia spinel product, comprising a dry substance mixture consisting of either:

a) a granular magnesia component of at least one magnesia having an MgO content <91.5 ma.-%, as the main component in an amount of ≥70 ma.-%, and a granular elastifier component in an amount of 2 to 10 ma.-% of at least one sintered bauxite with an $Al_2O_3$ content of 70 to 92 ma.-%, the elastifier component having a grain size according to DIN 66165-2:2016-08≤2.5 mm, and the elastifier component having grains with a grain size according to DIN 66165-2:2016-08 of ≤0.5 mm at most in an amount of ≤25 ma.-%, or b) the granular magnesia component of a) as the main component, the granular elastifier component of a), and a further granular magnesia component of at least one magnesia with a higher MgO content than the main component, wherein the average MgO content of all magnesia grades of the dry substance mixture taken together is 85 to 91.5 ma.-%.

2. The batch according to claim 1, wherein the elastifier component comprises grains with a grain size according to DIN 66165-2:2016-08 of ≤0.2 mm at most in an amount of ≤10 ma.-%.

3. The batch according to claim 1, wherein the elastifier component comprises grains with a grain size according to DIN 66165-2:2016-08 of >2 mm at most in an amount of ≤25 ma.-%.

4. The batch according to claim 1, wherein the MgO content of the at least one magnesia of the main component is 85 to <91.5 ma.-%.

5. The batch according to claim 1, wherein the at least one sintered bauxite has an $Al_2O_3$ content of 78 to 91 ma.-%.

6. The batch according to claim 1, wherein the averaged MgO content of all magnesia grades of the dry substance mixture taken together is 87 to 90 ma.-%.

7. The batch according to claim 1, wherein the averaged MgO content of all magnesia grades of the dry substance mixture taken together is ≤90 ma.-%.

8. The batch according to claim 1, wherein the $CaO/SiO_2$ ratio of all components of the dry substance mixture taken together is 1.2 to 3.0.

9. The batch according to claim 1, wherein the dry substance mixture comprises the further magnesia component in an amount of 5 to 28 ma.-%.

10. The batch according to claim 1, wherein the batch does not contain any MnO, or $MnO_2$, or $Mn_2O_3$ raw material.

11. The batch according to claim 1, wherein the batch comprises at least one dry binder and/or at least one dry additive in addition to the dry substance mixture.

12. The batch according to claim 1, wherein the batch consists of at least 90% by weight of the dry substance mixture, in relation to the total dry mass of the batch.

13. The batch according to claim 1, wherein the elastifier component exclusively comprises crushed granular material (s).

14. The batch according to claim 1, wherein the dry substance mixture exclusively comprises crushed granular material(s).

15. The batch according to claim 1, wherein the grain size distribution of the main component and/or the grain size distribution of the elastifier component and/or the grain size distribution of the further granular magnesia component and/or the grain size distribution of all magnesia grades of the dry substance mixture taken together is continuous.

16. A method for producing a coarse ceramic, refractory, shaped or unshaped, fired or unfired magnesia spinel product, wherein the method comprises the process steps of:

providing the dry batch according to claim 1, and forming the coarse ceramic product using the dry batch.

17. The method according to claim 16, wherein the product is produced from a press mass containing the batch and at least one liquid binder and/or water.

18. The method according to claim 17, wherein the liquid binder is a binder from the following group:

thermosetting synthetic resin binder or a sulfur-free binder or a sulfate or a sol-gel system.

19. The method according to claim 16, wherein the shaped product is a green shaped body.

20. The method according to claim 16, wherein the shaped product is a tempered shaped body.

21. The method according to claim 16, wherein the shaped product is a fired shaped body.

22. The method according to claim 21, wherein the fired shaped body has an E-modulus of 15 to 35 GPa.

23. The method according to claim 21, wherein the fired shaped body has a G-modulus of 7 to 16 GPa.

24. The method according to claim 21, wherein the fired shaped body has a cold compressive strength according to DIN EN 993-5:1998-12 of 40 to 120 MPa.

25. The method according to claim 21, wherein the fired shaped body has a cold bending strength according to DIN EN 993-6:1995-04 of 3 to 10 MPa.

26. The method according to claim 21, wherein the fired shaped body a refractoriness under load value $T_{0.5}$ according to DIN EN ISO 1893:2008-09 of 1100 to 1750° C.

27. The method according to claim 21, wherein the fired shaped body has an open porosity of 12 to 28 vol. %, determined in accordance with DIN EN 993-1:1995-04.

28. The method according to claim 21, wherein the fired shaped body has a compression $Z_{max}$ at 1700° C. according to DIN EN ISO 1893:2008-09 of 0.5 to 5 lin.-%.

29. The method according to claim 16, wherein forming the coarse ceramic product comprises the following method steps:

a) mixing the batch with at least one liquid binder and/or water to form a press mass, and b) shaping the press mass into a green shaped body.

30. The method according to claim 29, wherein the green shaped body is dried and drying is carried out to a residual moisture content of between 0.1 and 0.6 ma.-%, determined in accordance with DIN 51078:2002-12.

31. A method of producing a lining of a large-volume industrial furnace, wherein the method comprises the process steps of:

producing at least one coarse ceramic product according to claim 16, and producing the lining using the at least one coarse ceramic product.

32. The method according to claim 31, wherein the lining comprises a working casing comprising the at least one coarse ceramic product.

33. The method according to claim 32, wherein the working casing is installed in a single-layer or multi-layer masonry.

34. The method according to claim 31, wherein the lining comprises an insulating backing comprising the at least one coarse ceramic product.

35. A method for producing a large volume industrial furnace, wherein the method comprises the process steps of:

producing the lining according to claim 31, and producing the industrial furnace using the lining.

36. The batch according to claim 1, wherein the MgO content of the at least one magnesia of the main component is <90 ma.-%.

37. The batch according to claim 1, wherein the batch contains the main component in an amount of ≥85 ma.-%.

38. The batch according to claim 1, wherein the batch contains the granular elastifier component in an amount of 3 to 8 ma.-%.

39. The batch according to claim 1, wherein the elastifier component has a grain size according to DIN 66165-2:2016-08 of ≤2 mm.

40. The batch according to claim 1, wherein the elastifier component has grains with a grain size according to DIN 66165-2:2016-08 of ≤0.5 mm at most in an amount of ≤20 ma.-%.

41. The method according to claim 35, wherein a burning kiln of the non-metal industry or a heating kiln or a kiln for energy production or a steel production kiln or a kiln of the non-ferrous metal industry is produced.

42. The method according to claim 41, wherein a cement kiln or a lime shaft kiln or a lime rotary kiln or a magnesite kiln or a dolomite kiln is produced.

* * * * *